Aug. 12, 1924.
C. W. LANDERS
PLOW
Filed April 7, 1922
1,505,037
3 Sheets-Sheet 2
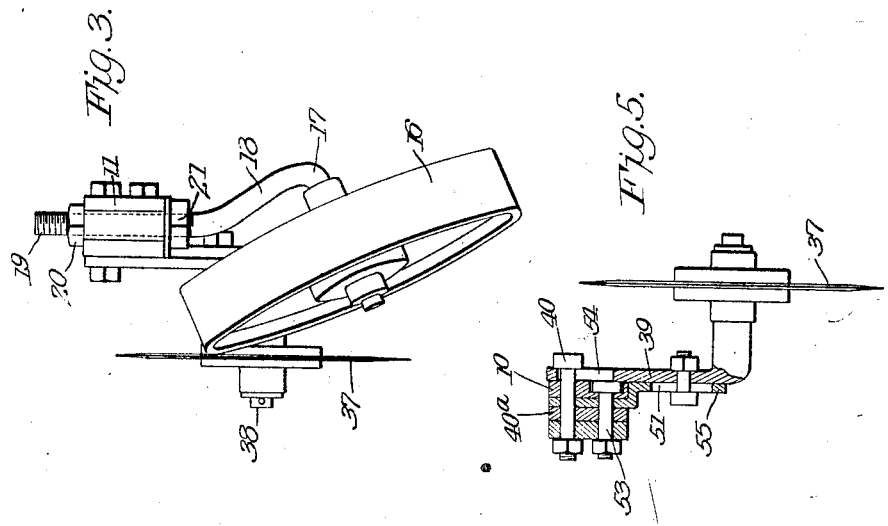
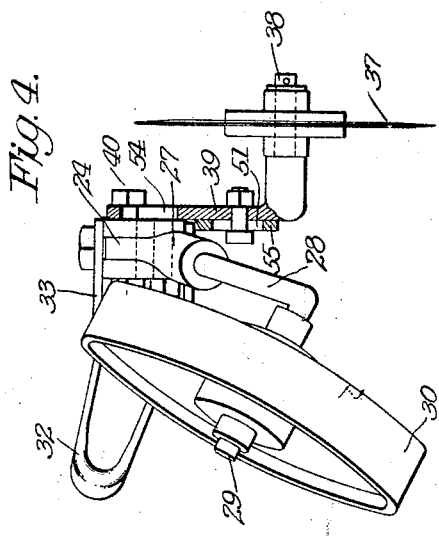
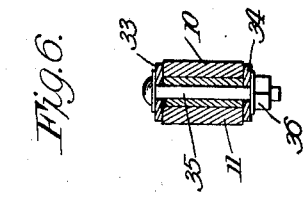
C. W. Landers
Inventor
Victor J. Evans
Attorney

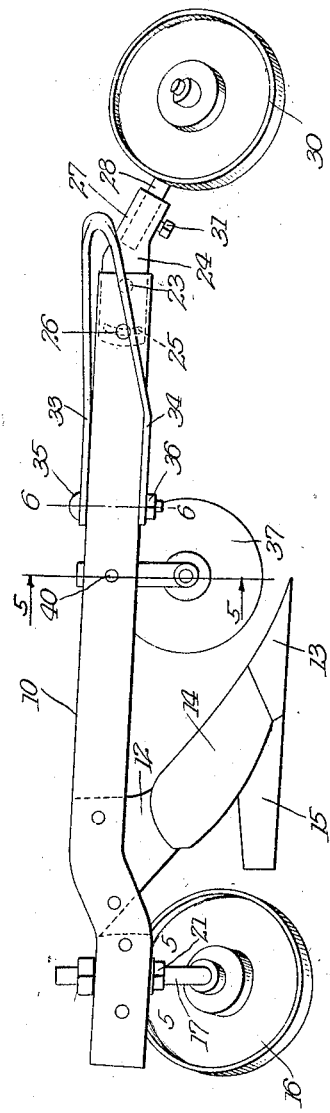

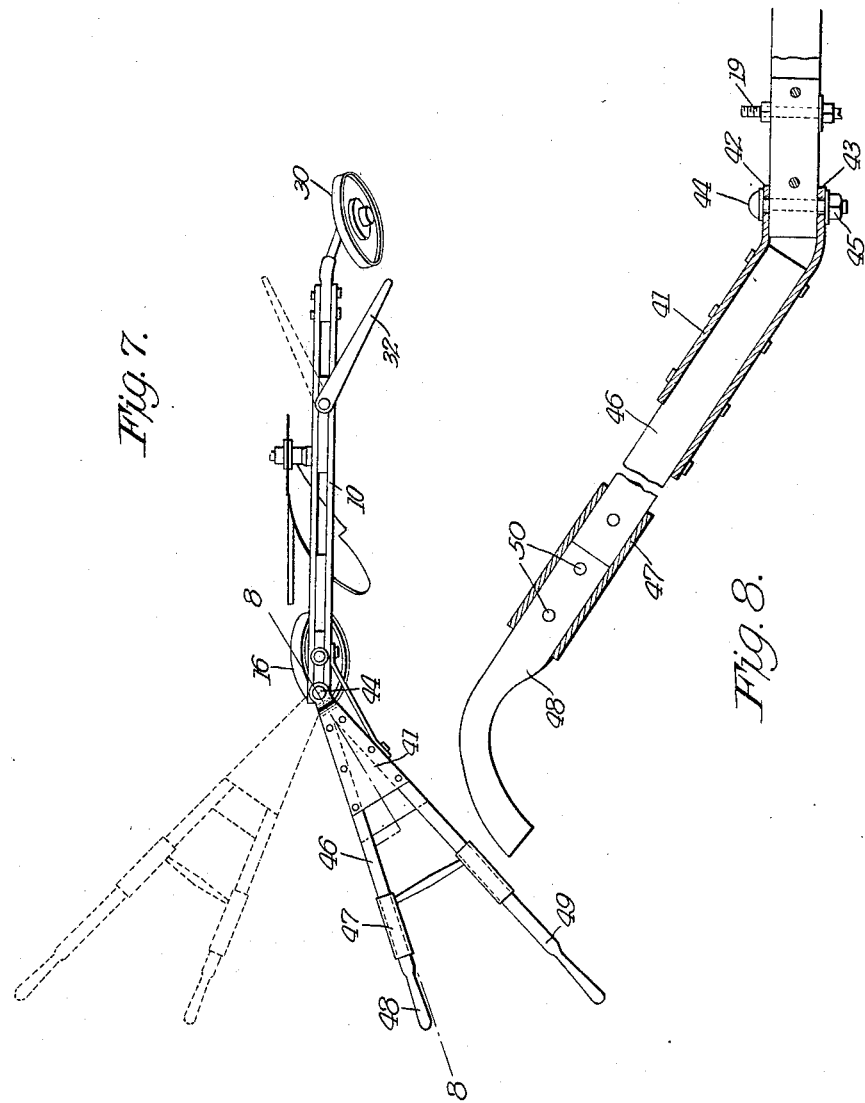

Patented Aug. 12, 1924.

1,505,037

UNITED STATES PATENT OFFICE.

CHARLES W. LANDERS, OF PENSACOLA, FLORIDA.

PLOW.

Application filed April 7, 1922. Serial No. 550,487.

*To all whom it may concern:*

Be it known that I, CHARLES W. LANDERS, a citizen of the United States, residing at Pensacola, in the county of Escambia and State of Florida, have invented new and useful Improvements in Plows, of which the following is a specification.

This invention relates to agricultural implements, particularly to plows, and has for its object the provision of a plow which is specially designed for breaking and cultivating the soil close up to orchard trees, vines, and the like, where the ordinary plow cannot operate on account of interference with the tree branches.

An important object is the provision of a plow of this character which is intended to be operated with the mold board toward the tree and moving the soil to the tree, or with the bar side to the tree so that the soil will be moved away from the tree or tree row.

More specifically, the object of the invention is the provision of a plow which is provided with a novel draft hitch which may be so arranged as to be disposed at either side of the plow beam, the beam furthermore having associated therewith a pair of handles of unequal length which are formed of detachable sections and which are interchangeable so that proper compensation may be made to meet certain contingencies.

Still another object is the provision of a plow having a novel steering mechanism including detachably mounted wheels which not only serve to ride upon the ground in the previous furrow, but which also operate to prevent or counterbalance the side-draft of the animal in pulling the plow.

An additional object is the provision of a plow of this character which will be simple and inexpensive in manufacture, easy to control and adjust, highly efficient in operation, durable in service, and a general improvement in the art.

With the above and other objects and advantages in view, the invention consists in the details of construction to be hereinafter more fully described and claimed and illustrated in the accompanying drawings, in which:

Figure 1 is a side elevation of the plow with the handles removed,

Figure 2 is a plan view thereof,

Figure 3 is a rear elevation,

Figure 4 is a front elevation with parts in section,

Figure 5 is a cross section on the line 5—5 of Figure 1,

Fig. 6 is a section on line 6—6 of Fig. 1;

Figure 7 is a plan view showing the draft hitch and handles extending at one side of the beam in full lines and at the other side in dotted lines, Figure 8 is a detail view showing the handle structure and arrangement.

Referring more particularly to the drawings, the numeral 10 designates a plow beam formed of strips or bars 11 having a downward offset near the rear end and spaced at the rear end by a metal block or filler and at the front end by an arm 24.

Near the rear portion of said beam there is secured between the bars that constitute the beam a suitable standard 12 which carries a plow share 13. This plow body has nothing distinctive about its construction and includes the usual mold board 14 and land side 15.

Associated with the rear end of the beam is a wheel 16 which is mounted upon an inclined spindle 17 the amount of the inclination, or lean of the wheel being approximately thirty degrees. This spindle is rotatably adjustable in relation to the beam so that the lean of the wheel can be always towards the tree.

This rear wheel serves three purposes: First, it carries the weight of the rear end of the plow, second, it helps to regulate the depth of the plow in the soil; and third, it steers the rear end of plow up under the branches, helping to control the side draft of the animal in drawing the plow.

The inclined spindle 17, is formed upon a peculiarly curved arm or standard 18 which terminates in an extension 19 passing vertically through the metal block or filler 19ª between the bars which constitute the beam. The upper end of said standard or arm is threaded sufficiently to take a nut 20 above and a nut 21 below the beam, and by which the beam may be sufficiently clamped to hold the standard in adjusted position. These nuts when loosened allow the standard to be turned to reverse the angle of wheel when the plow is changed from moving the soil to the tree row to moving it from the tree row, or vice versa.

Associated with the front end of the beam is a steering and regulating wheel 30. This wheel serves three purposes; first, it carries the weight of the front end of the beam; second, it is the chief factor in regulating the depth of the plow in the soil; and third, it counteracts or balances the side draft of the animal, steering the front end of the beam up under the branches to the trunk of the tree. To accomplish the latter purpose, the wheel has an angle or inclination of about thirty degrees toward the tree row and has a lean or angle to travel in a line slightly diagonal to the line of travel of the plow, this angle being about ten degrees and toward the tree row.

The standard 28 upon which the wheel is mounted by means of spindles 29, is held in the free end of an adjusting arm 24 by means of socket 27 within which it is rotatably adjustably engaged. Adjusting arm 24, pivoted at 23, serves as spacer between the forward end of the bars 11, and at its rear end it is provided with an arcuate slot 25, through which passes a securing bolt 26 which passes through the bars 11 and which serves the purpose of holding the adjusting arm 24 in a certain adjusted position depending upon the depth it is desired that the plow should run.

Associated with the rear end of beam is the handle structure which includes a V-shaped member 41, having upper and lower plates 42 and 43 disposed upon the upper and lower edge of the beam respectively and held in position by a bolt 44 carrying a nut 45. Connected with the V-shaped member 41 and with it forming a convenient tool box, are diverging arms 46 which carry steel sockets 47 within which are engaged handles 48 and 49, the handle 48 being of less length than the handle 49, the object of which is to allow the handle farther from the tree to extend farther out in order to enable the operator to walk between the handles.

When in making adjustment the handles are swung from one side to the other the sections 48 and 49 are exchanged so that the longer section 49 shall be on the side farther from the tree row. The handles are held in position by a bolt 50.

In Figure 7, the handle structure is shown in full lines as extended from one side of the beam and by dotted lines as extending from the other side of the beam corresponding to the position of the draft device 32.

The numeral 32 designates the draft rig which is formed in the nature of a loop or very long clevis, having its arms 33 and 34 disposed against the top and bottom of the beam 10 and engaging the beam through the filler or spacer to which also the colter standard is connected. Said clevis is held associated therewith by means of a bolt 35 carrying a nut 36. It may be observed that this draft device 32 may be arranged to extend from either side of the beam as shown in Figure 7. In order that the animal that draws the plow may be sufficiently removed from the tree and line of travel of plow. the hitch is lengthened to any desired length by means of a chain or cable which is of course attached to the member 32.

Just to the front of the plow share, and in line with its land side, is a colter disc 37, carried by spindle 38, projecting laterally from a depending arm 39 bolted onto the side of beam 10 as shown at 40. In order that this colter may be held sufficiently secure and rigid and also to allow for its vertical adjustment, a metal filler or spacer 40ª is placed between the bars 11. In the side of the filler is a channel into which is fitted a steel strap 55 the upper end of which is flush with top of beam, the lower end extending below the beam, said strap having an offset outward equal to the thickness of the bar 11. This strap, spacer and bars 11 are all bolted rigidly together with a countersunk bolt 53. The lower end of said strap has a slot 51 through which is adjustably bolted the colter standard 39. The upper end of this colter standard is also slotted at 54 and receives an additional bolt 40, which passes through the beam bars 11, the filler, and the strap associated therewith. By means of these slots the colter disc is given vertical adjustment. The object of this colter is to cut the turf, grass, weeds. etc., thus aiding the mold board in turning under, without clogging, whatever vegetation may be on the land.

In the operation of this implement, it will be apparent that the steering of the plow is accomplished by means of two wheels, front and rear. The rear wheel is always in the furrow immediately to the rear of the plow bottom. The front wheel runs in the previous furrow only when the bar side of the plow is operated toward the tree row, and on the unplowed land and in line with the land side, when the mold board is operated toward the tree row. In both instances the lead and angle or inclination of both wheels are toward the tree row and steer the plow up under the branches to the trunk of the tree.

The depth of the plow in the soil is regulated by the vertical position of the two wheels, the front wheel effecting this feature more than the rear wheel. The rear wheel is adjusted vertically by means of the adjusting nuts 20 and 21 which hold its standard. The front wheel is adjusted vertically by the slot adjustment in arm 24, which is pivoted at 23.

The downward offset disclosed in the rear of the beam is for the purpose of allowing the rear wheel standard 18 to extend above the beam for adjustment without extending above the top line thereof to a sufficient extent to come into contact with low-hanging branches.

From the foregoing description and a study of the drawings, it will be apparent that I have thus provided a simply constructed and consequently inexpensive plow which is particularly adapted for orchard use, that is, for cultivating trees, vines, bushes and the like which grow so close to the ground that the branches would interfere with the action of the ordinary plow. It is also to be observed that in the present device the arrangement may be such that either the land side or the mold board of the plow may be disposed toward the tree, bushes or the like, whereby to throw up the dirt toward the trees or to throw it away from them as may be preferred. It is also to be noticed that the handles, being of unequal length, and being disposable at either side of the beam, form ample means for control by the operator without its being necessary for the operator to be directly behind the beam, the handles proper being further interchangeable and detachably connected with the handle portion of the structure which is carried by the beam.

An additional meritorious feature is the provision of the extra long clevis which is attached to the beam in a detachable manner and which is capable of disposition at either side thereof, the steering wheels being moreover removable and detachably mounted whereby to correspond with the change of side of the handles and the clevis so that an efficient and operative device will be provided, capable of fulfilling all the functions for which it is intended.

While I have shown and described the preferred embodiment of my invention, it is of course to be understood that I reserve the right to make such changes in the form, construction and arrangement of parts as will not depart from the spirit of the invention or the scope of the subjoined claims.

Having thus described my invention I claim:

1. A plow comprising a beam, a standard secured to and depending from the beam, a plow share carried by said standard and including a land side and a mold board, interchangeable handles connected with the rear portion of the beam and adapted to be extended from either side thereof, draft means detachably connected with the forward portion of the beam and designed to be disposed in an inclined direction from either side thereof in correspondence with the arrangement of the handles, and a pair of steering wheels supported upon adjustable standards connected with the beam.

2. A plow comprising a beam, a standard secured to and depending from the beam, a plow share carried by said standard and including a land side and a mold member, interchangeable handles connected with the rear portion of the beam and adapted to be extended from either side thereof, draft means detachably connected with the forward portion of the beam and designed to be disposed in an inclined direction from either side thereof in correspondence with the arrangement of the handles, and a pair of steering wheels supported upon adjustable standards connected with the beam, the wheels being disposed normally diagonally with respect to the direction of travel and also diagonally with respect to the ground, said wheels being capable of reversal in correspondence with the reversing of the position of the handles and the draft means.

3. A plow comprising a beam, a standard secured to and depending from the beam, a plow share carried by said standard and including a land side and a mold member, interchangeable handles connected with the rear portion of the beam and adapted to be extended from either side thereof, draft means detachably connect with the forward portion of the beam and designed to be disposed in an inclined direction from either side thereof in correspondence with the arrangement of the handles, said wheels being vertically adjustable independent of each other and being also rotatably adjustable with respect to the beam whereby to effect reversal.

4. A plow comprising a beam, a standard carried by the beam and carrying a plow share, a vertically and angularly adjustably mounted wheel at the rear portion of the beam, a socket member vertically angularly mounted upon the forward end of the beam, a front wheel mounted upon a standard revolubly adjustably carried by said socket, a draft device connected with the forward portion of the beam and extending from either side thereof, and a handle structure rotatably adjustably connected with the rear end of the beam and disposable to extend at an angle from either side thereof in correspondence with the position of said draft device.

In testimony whereof I affix my signature.

CHARLES W. LANDERS.